Oct. 9, 1956 L. Z. BULLIS 2,765,845
MACHINE FOR TRUING TIRES
Filed Feb. 9, 1954 2 Sheets-Sheet 1

INVENTOR.
LLOYD Z. BULLIS
BY
Kimmel & Crowell
Attys.

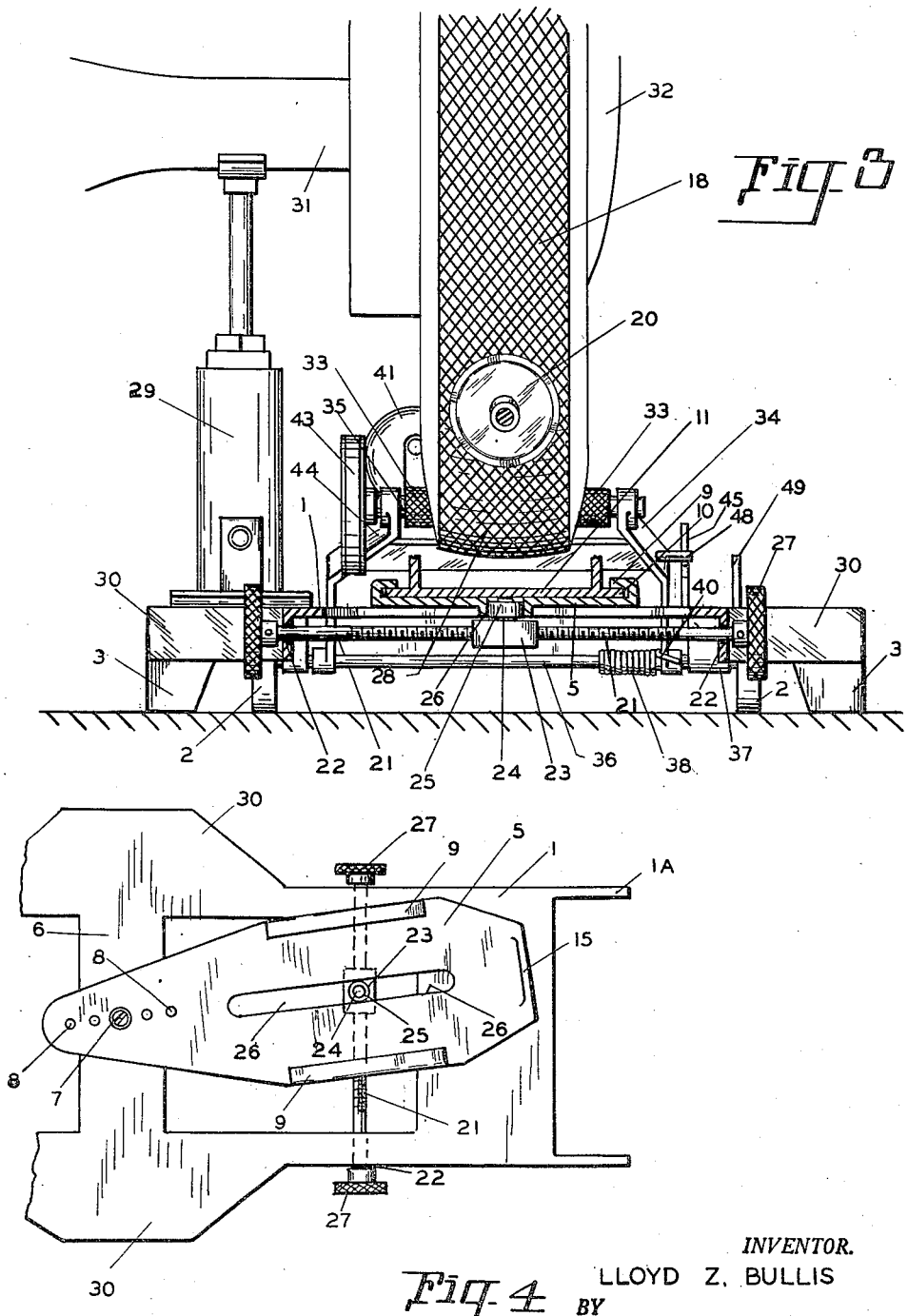

United States Patent Office 2,765,845
Patented Oct. 9, 1956

2,765,845

MACHINE FOR TRUING TIRES

Lloyd Z. Bullis, Sunnyside, Wash.

Application February 9, 1954, Serial No. 409,163

3 Claims. (Cl. 164—10.2)

My invention relates to improvements in a machine for truing tires, and is particularly adapted for taking high spots off of tread due to uneven wear.

The primary object of my machine for truing tires is to provide a power driven cutting disk mounted on a frame, the disk adapted to cut off the high points of the tread while the wheel and tire are being revolved.

A further object of my invention is the provision of a machine for truing tires upon which the axle of the vehicle can be supported, positioning the wheel and tire in a position relative to the cutting element for cutting the high spots off the tire.

Another object of my invention is the provision of means for positioning the cutter wheel about the arc of the tread while removing the high spots.

A still further object of the invention is to provide means of adjusting the cutting disk to the various diameters of wheels.

These and other incidental objects will be apparent in the drawings, specification and claims.

Referring to the drawings:

Figure 3 is an end sectional view of the machine, taken on line 3—3 of Figure 1, looking in the direction indicated.

Figure 4 is a fragmentary plan view of the base and sub-base of the machine, other parts having been removed.

Figure 1:
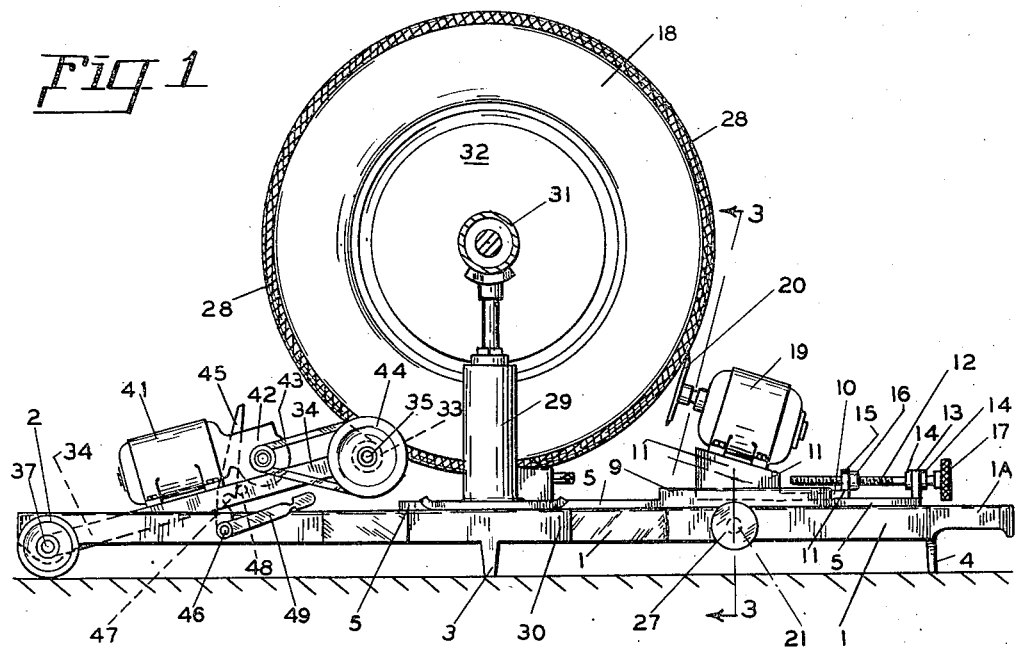
Figure 1 is a side view of the machine having a tire and wheel supported thereon. This view is taken from the inside of the wheel looking outwardly.
Figure 2:
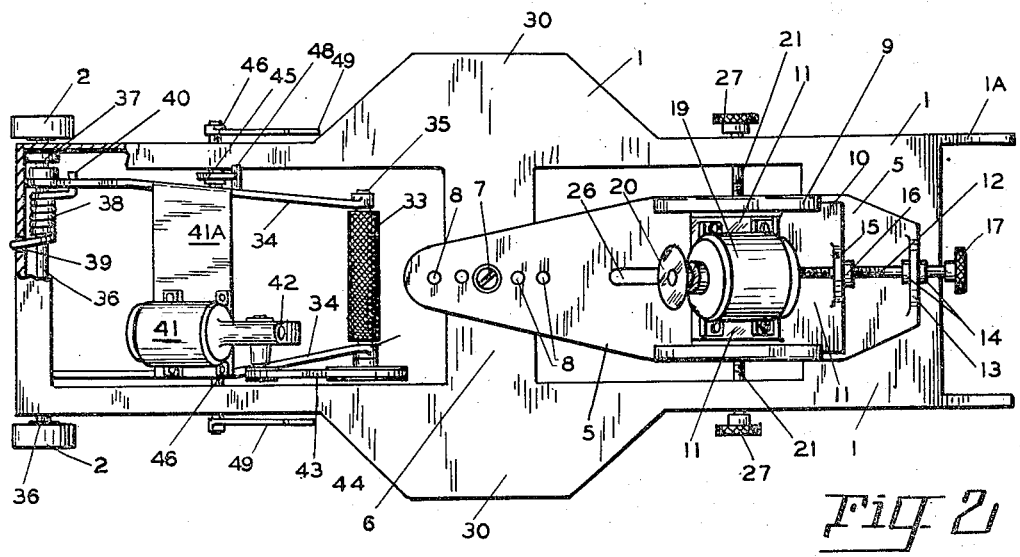
Figure 2 is a plan view of Figure 1, the wheel having been removed therefrom.

Referring more specifically to the drawings:

My new and improved machine for truing tires consists of a base 1 supported on one end by the wheels 2 and midway its length by the legs 3 and at its opposite end by the legs 4. A sub-base 5 is adjustably and pivotally mounted to the cross member 6 of the frame 1 by the bolt 7. The bolt 7 is threaded into the cross member 6 of the frame 1 after one of the holes 8 are selected, the selection of the hole depending upon the diameter of the tire to be trued.

Guideways 9 are formed on the upper edges of the base 5 and are adapted to receive the flanges 10 of the movable base 11. The position of the base 11 is determined by the adjusting screw 12. This screw is positioned on the sub-base 5 by the upwardly extending leg 13 by way of the collars 14 which are pinned to the screw 12 and embracing the leg 13. Extending upwardly from the base 11 is a leg 15 having a threaded nut 16 forming part thereof and adapted to cooperate with the threads of the screw 12. A hand wheel 17 forms part of the screw 12 and is adapted to revolve the same, moving the base 11 away from or towards the tire 18.

Mounted upon the base 11 is a motor 19. A cutting disk 20 is mounted to the shaft of the motor 19 and is revolved by the motor 19. As stated above, the sub-base 5 is pivotally mounted about the bolt 7 and it is adjusted by the threaded cross shaft 21, which is journalled within the frame 1 at 23. Threaded to the shaft 21 is a nut or block 23. Extending upwardly from this nut is a stub shaft 24 upon which is rotatably mounted a roller 25. The roller 25 is adapted to operate within the slot 26 formed in the sub-base 5.

Hand wheels 27 are keyed to the shaft 21 and are adapted to revolve the same from either side of the machine. By revolving the shaft 21 the sub-base 5 can be moved from one side to the other of the base 1 about the pivot 7, thereby moving the base 11 and the cutting wheel 20 about the tread 28 of the tire 18 while the cutting disk 20 is revolving and removing the high spots from the tire 18.

In order to support the tire 18 in the proper position, a jack 29 is mounted on the outwardly extending portions 30 of the base 1 and is adapted to raise the axle 31 of the wheel 32, as best illustrated in Figures 1 and 3. The jack 29 is of a type that is of a stable nature so that no relative movement can be had between the jack 29 and the base 1 while truing the tire 18.

The tire 18 is revolved by a roller 33, which is journalled to the pivotally mounted frame 34 by way of the shaft 35. The opposite end of the frame 34 is pivotally journalled to the cross shaft 36, which is mounted to the frame 1 at 37. A spring 38 is adapted to raise the frame 34 by having one of its ends 39 anchored to the frame 1, and its opposite end bearing under the frame 34 at 40.

The roller 33 is rotated slowly by the motor 41, reduction gear 42, belt 43 and pulley 44, thereby revolving the tire 18 slowly past the cutting disk 20. The motor 41 is mounted to the cross platform 41A forming part of the frame 34. Latches 45 are fixedly secured to the cross shaft 46 journalled within the frame 1. These latches have a hook 47 which is adapted to engage the outwardly extending pin 48 forming part of the frame 34. The shaft 46 can be revolved from either side of the machine by the levers 49. The weight of the levers 49 holds the latch 45 against the pin 48. By pushing down on the frame 34 the pin 48 will latch into the hooks 47, thereby holding the roller 33 away from the face of the tire 18. This permits the revolving of the tire 18 by hand freely.

I will now describe the operation of my new and improved machine for truing tires. Both wheels on the same axle are raised by a jack. The machine is then moved under one of the wheels by way of its wheels 2 and the handles 1A to the proper position, then a jack 29 is placed under the axle 31 resting on the portion 30 of the frame 1 of the machine. The opposite wheel is then placed on a block so that the axle 31 will be relatively level. The jack 29 raises the axle 31 to the proper height, bringing the tire 18 into position as shown in Figures 1 and 3.

The driving roller 33 is then released by the latch 45 to contact the tread 28 of the tire, the position of the sub-frame 5 having been set in regards to its adjustment on its pivot pin 7 to conform to the diameter of the tire 18. The hand wheel 17 is then revolved to bring the cutting disk 20 to the proper position in regards to the face 28 of the tire 18, or to the lowest point on the face 28 of the tire 18.

The motor 41 is then started, revolving the tire 18 past the cutting disk 20, the disk 20 removing the high spots from the tread 28 of the tire 18. At the same time one of the hand wheels 27 is rotated moving the nut 23 along the shaft 21 so as to pivot the sub-frame 5 about its pivot point 7 carrying the cutting disk 20 over the tread 28 of the tire 18, completely truing the tread 28 as the tire 18 is being revolved.

When it is desired to reset the cutting disk 20, the driving roller 33 is positioned away from the tire 18 and held by the latch 45 until the lowest part on the face 28 of the tire 18 has again been adjusted to the cutting disk 20, after which the latch 45 will release, allowing the driving roller 33 to contact the tread 28 of the tire 18. This is repeated until the tread 28 of the tire 18 is completely true.

What is claimed is:

1. In a machine of the class described, an elongated base, a sub-base mounted on said elongated base adjacent one end thereof, pivot means connecting the forward end of the sub-base to the base, guideways formed on the lateral edges of the sub-base, a sliding base mounted on the sub-base and engaging said guideways, upstanding flanges on the rear portions of the sub-base and the sliding base, an adjusting screw rotatably mounted in the upstanding flange of the sub-base and having treaded connection with the upstanding flange of the sliding base, a motor inclinedly mounted on said sliding base, said motor having a shaft, a cutting disc carried by said shaft, means to support a tire provided wheel with its periphery engageable with said cutting disc, and means for swinging the rear end of the sub-base laterally.

2. In a machine of the class described, an elongated base, a sub-base mounted on said elongated base adjacent one end thereof, pivot means connecting the forward end of the sub-base to the base, guideways formed on the lateral edges of the sub-base, a sliding base mounted on the sub-base and engaging said guideways, upstanding flanges on the rear portions of the sub-base and the sliding base, an adjusting screw rotatably mounted in the upstanding flange of the sub-base and having treaded connection with the upstanding flange of the sliding base, a motor inclinedly mounted on said sliding base, said motor having a shaft, a cutting disc carried by said shaft, means to support a tire provided wheel with its periphery engageable with said cutting disc, and means for swinging the rear end of the sub-base laterally comprising said sub-base having a longitudinal slot therein provided with guides at it sides extending downwardly, a nut having a rib mounted between the downwardly projecting guides, said base having at its sides downwardly projecting flanges, an adjusting screw extending through said nut and rotatably mounted in the downwardly projecting flanges of the base and hand wheels on the end of the screw rotating the same.

3. The device of claim 2 characterized by having the base provided with means for rotating said wheel.

References Cited in the file of this patent

UNITED STATES PATENTS

| 1,121,924 | Johnston | Dec. 22, 1914 |
| 1,385,975 | Replogle | July 26, 1921 |
| 1,486,474 | Baker | Mar. 11, 1924 |
| 1,567,472 | Skiles | Dec. 29, 1925 |
| 1,668,214 | Liebau | May 1, 1928 |
| 1,713,248 | Zimarik | May 14, 1929 |
| 2,099,458 | Althen | Nov. 16, 1937 |
| 2,200,575 | Haskins | May 14, 1940 |
| 2,601,810 | James | July 1, 1952 |
| 2,651,893 | Braley | Sept. 15, 1953 |

FOREIGN PATENTS

| 592,231 | Germany | Apr. 23, 1934 |